United States Patent [19]

Urban

[11] 3,972,988

[45] Aug. 3, 1976

[54] SULFUR PRODUCTION

[75] Inventor: Peter Urban, Northbrook, Ill.

[73] Assignee: Universal Oil Products Company, Des Plaines, Ill.

[22] Filed: May 5, 1975

[21] Appl. No.: 574,221

[52] U.S. Cl............................... 423/571; 423/573 R
[51] Int. Cl.² ......................................... C01B 17/02
[58] Field of Search.................... 423/567, 571, 573; 210/63

[56] References Cited
UNITED STATES PATENTS

| | | | |
|---|---|---|---|
| 3,039,855 | 6/1967 | Urban................................. | 423/573 |
| 3,627,465 | 12/1971 | Hamblin........................... | 423/57 X |
| 3,634,037 | 1/1972 | Hamblin.......................... | 423/571 X |
| 3,672,835 | 6/1972 | Urban et al......................... | 423/571 |

Primary Examiner—G. O. Peters
Attorney, Agent, or Firm—James R. Hoatson, Jr.; Raymond H. Nelson; William H. Page II

[57] ABSTRACT

A process is disclosed for the production of sulfur which comprises the oxidation of a sulfide solution in the presence of a catalyst comprising a metal phthalocyanine compound to produce sulfur and a polysulfide effluent, decomposition of the polysulfide effluent with steam at a temperature of from about 115° to about 125°C. and a pressure of 10 psig, to about 20 psig. to produce a vaporous phase effluent containing water, hydrogen sulfide and ammonia, the oxidation of at least a portion of the vaporous effluent with an oxygen-containing gas in the presence of a catalyst comprising a metal phthalocyanine compound dispersed on a solid support, said catalyst being in contact with a liquid phase comprising a thiosulfate-containing compound, at a temperature of from about 115° to about 125°C. and a pressure of from about 10 psig. to about 20 psig. to produce steam, sulfur and a thiosulfate compound and the recovery of the resultant sulfur.

12 Claims, 1 Drawing Figure

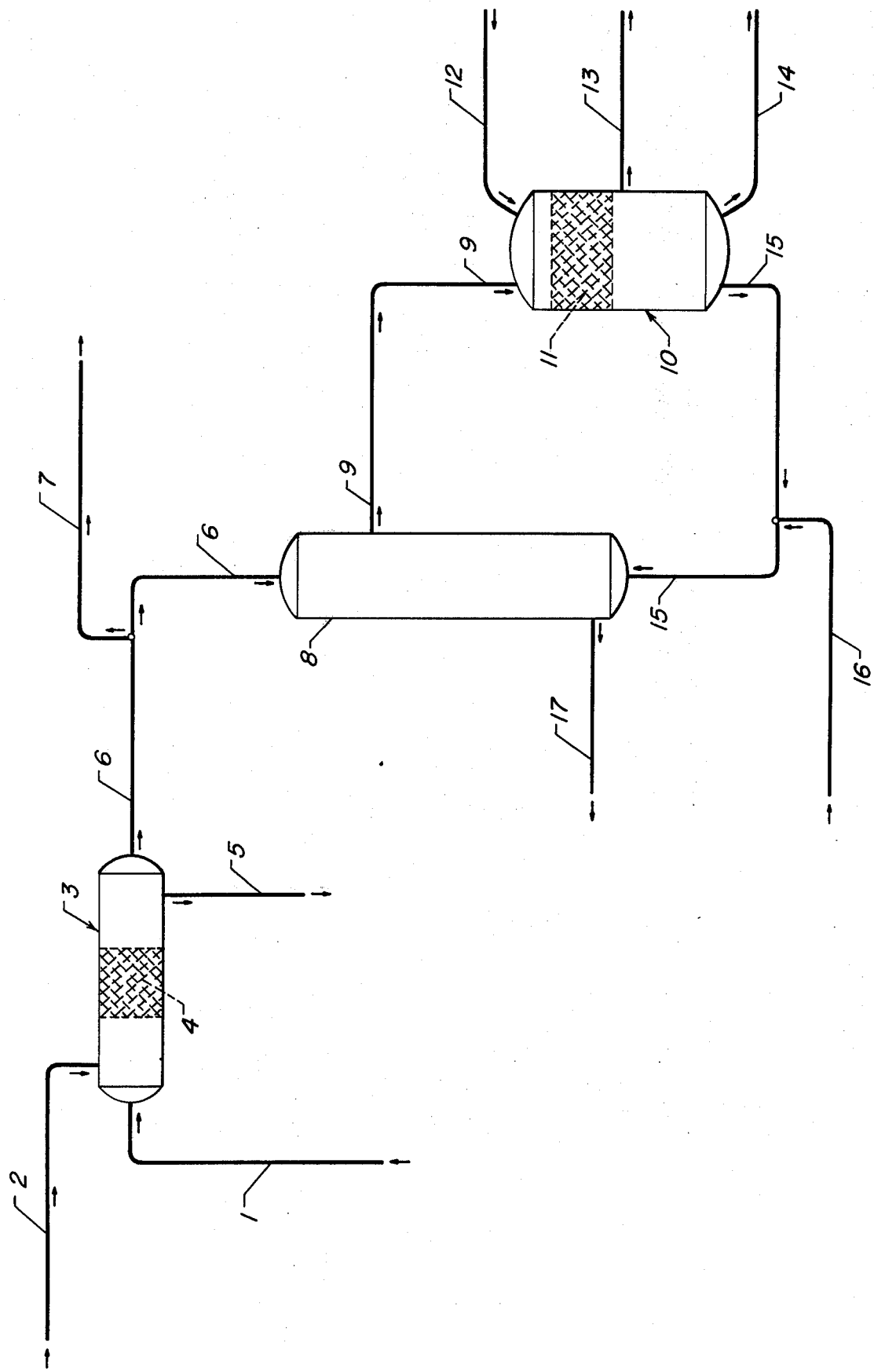

SULFUR PRODUCTION

The subject of the present invention is a process for the production of sulfur from a sulfide solution. More specifically, this invention relates to a process for the production of sulfur which comprises contacting a sulfide solution with an oxygen-containing gas in the presence of a catalyst comprising a metal phthalocyanine compound in a first oxidation zone to produce sulfur and a polysulfide effluent, decomposing at least a portion of the polysulfide effluent in a first decomposition zone at a temperature of from about 115° to about 125°C. and a pressure of about 10 psig. to about 20 psig. to produce a vaporous phase effluent containing water, hydrogen sulfide and ammonia, contacting at least a portion of the vaporous effluent with an oxygen-containing gas in the presence of a catalyst comprising a metal phthalocyanine compound dispersed on a solid support, said metal phthalocyanine compound being in contact with a liquid phase comprising a thiosulfate-containing compound, in a second oxidation zone at a temperature of from about 115° to about 125°C. and a pressure of from about 10 psig. to about 20 psig. to produce steam, sulfur and a thiosulfate compound and recovering the resultant sulfur.

The production of sulfur from sulfide-containing streams is well known in the chemical arts. It has been shown that an aqueous sulfide stream may be oxidized in the presence of air and a metal phthalocyanine catalyst to produce sulfur and a polysulfide compound. Further, a polysulfide compound has been shown to be charged to a stripper or decomposition zone in which hydrogen sulfide, water and ammonia is produced by the treatment with steam. The resulting mixture has been shown to be further treated in a second oxidation zone in a liquid phase to produce the desired sulfur. The prior art has shown that the production of sulfur in the second oxidation zone and the decomposition of the polysulfide in the stripper decomposition zone is effected at reaction conditions which create a liquid effluent stream comprising water, hydrogen sulfide and ammonia for passage to a second oxidation zone. It has also been shown that the second oxidation zone for the treatment of the water, hydrogen sulfide and ammonia has been run in a liquid phase operation.

In contradistinction to the prior art it has now been discovered that sulfur may be produced from a sulfide solution by the oxidation of said sulfide solution with air in the presence of a metal phthalocyanine catalyst to produce a sulfur and polysulfide effluent, decomposing the polysulfide effluent stream with steam in a first decomposition zone at a temperature of 115° to about 125°C. and a pressure of about 10 psig. to about 20 psig. to produce a vaporous phase effluent containing water, hydrogen sulfide and ammonia and a liquid effluent comprising water, ammonia and elemental sulfur and contacting at least a portion of the vaporous effluent stream comprising water, hydrogen sulfide and ammonia with an oxygen-containing gas in the presence of a catalyst comprising a metal phthalocyanine compound dispersed on a solid support, said metal phthalocyanine compound being in contact with a liquid phase comprising a thiosulfate-containing compound, in a second oxidation zone at a temperature of about 115° to about 125°C. and a pressure of from about 10 psig. to about 20 psig. to produce steam, sulfur and a thiosulfate compound. The above set forth invention has been found to utilize the reaction conditions of low temperature and low pressure in the decomposition and second oxidation zone to afford the production of the sulfur in a process in which the effluent containing water, hydrogen sulfide and ammonia is in a vaporous phase and charging the vaporous phase effluent to a second oxidation zone which is held at low pressure and low temperature conditions to effect the second oxidation in a vaporous phase without condensation of a significant quantity of the vaporous phase.

As a result of large industrial complexes necessary to maintain the standard of living of a modern industrial society large quantities of undesired solutions of sulfide compounds are currently being ejected as waste streams from a number of industrial sources. In particular, various aqueous streams are undesireable side products of many economically significant industrial processes in the chemical, petroleum and steel industries. For example, hydrorefining, hydrocracking and reforming are examples of processes in the petroleum industry which emit a large quantity of solutions containing sulfide compounds, mostly in aqueous phase. These set forth petroleum processes must necessarily contain the sulfide compounds as a result of the utilization of coal tar oil, shale oil and crude oil, which naturally contains organic or inorganic sulfur compounds. These sulfide compounds are transformed from certain organic sulfur compounds and mixed into aqueous streams. These aqueous streams present disposal problems as a result of their potential biological oxygen demand which is primarily a consequence of the presence of the sulfide ion. In particular, hydrorefining of crude oil emits large quantities of ammonia and hydrogen sulfide which are generally absorbed in an aqueous solution which is withdrawn from the hydrorefining process. This aqueous solution must be disposed of without endangering the environment and preferably at a small cost to the refiner. The cost of transforming the sulfide solution to a useful sulfur compound may be performed with less expenditure of money and capitalization by the utilization of the low pressure and low temperature conditions of this invention. The low pressure and low temperature utilized in the process of this invention will result in a smaller amount of energy necessary for the continuous disposal of the sulfide solutions.

The sulfur recovered as a result of the above set forth process may be utilized in the chemical industry in various ways. For example, sulfur may be utilized in agriculture for pest control; in industrial rubber volcanization; in industrial polymerization of synthetic rubber; in the coking of steel; in the study of the effect of sulfur on engine wear; in silver plating solutions; in protein metabolism; in sulfur active agents and drugs; in the medical profession; etc. It is also contemplated within the scope of this invention that a thiosulfate compound may also be recovered subsequent to the second oxidation stage. Examples of thiosulfate compounds would include ammonium thiosulfate, which may be utilized as a photographic fixing agent; analytical reagent; fungicide; as a reducing agent; as a cleaning compound for zinc-base die-cast metals; as a brightener in silver plating baths; or as a fog screen; etc.

It is therefore an object of this invention to provide a commercially feasible process for the production of sulfur from a sulfide-containing stream utilizing various reaction conditions in said process to minimize the cost of production and decrease the problem of sulfur recovery.

In one aspect an embodiment of this invention resides in a process for the preparation of sulfur which comprises contacting a sulfide solution with an oxygen-containing gas in the presence of a catalyst comprising a metal phthalocyanine compound in a first oxidation zone at polysulfide-formation conditions to produce sulfur and a polysulfide effluent, decomposing at least a portion of the polysulfide effluent with steam in a first decomposition zone at a temperature of from about 115° to about 125°C. and a pressure of about 10 psig. to about 20 psig. to produce a vaporous phase effluent containing water, hydrogen sulfide and ammonia, contacting at least a portion of the vaporous effluent comprising water, hydrogen sulfide and ammonia with an oxygen-containing gas in the presence of a catalyst comprising a metal phthalocyanine compound dispersed on a solid support, said metal phthalocyanine compound being in contact with a liquid phase comprising a thiosulfate-containing compound, in a second oxidation zone at a temperature of from about 115° to about 125°C. and a pressure from about 10 psig. to about 20 psig. to produce steam, sulfur and a thiosulfate compound and recovering the resultant sulfur.

A specific embodiment of this invention resides in a process for preparing sulfur from a stream comprising ammonium sulfide which comprises contacting said ammonium sulfide with air in the presence of a metal phthalocyanine catalyst at a temperature of from about 0° to about 200°C. and a pressure of from about 1 atmosphere to produce ammonium polysulfide, decomposing at least a portion of the ammonium polysulfide in a first decomposition zone by contacting said ammonium polysulfide with steam at a temperature of from about 115° to about 125°C. and a pressure of from about 10 psig. to about 20 psig. to produce a liquid effluent comprising water, ammonia and elemental sulfur and a vaporous stream effluent containing water, hydrogen sulfide and ammonia and contacting at least a portion of the vaporous effluent containing water, hydrogen sulfide and ammonia with an oxygen-containing gas in the presence of a catalyst comprising a metal phthlocyanine compound dispersed on a charcoal support, said metal phthalocyanine compound being in contact with a liquid phase comprising ammonium thiosulfate, in a second oxidation zone at a temperature from about 115° to about 125°C. and a pressure of from about 10 psig. to about 20 psig. to produce steam, sulfur and ammonium thiosulfate and recovering the resultant sulfur.

Other objects and embodiments of the present invention encompass sulfide-containing solutions, oxidizing catalysts, oxygen-containing gases, polysulfide-formation conditions, decomposition conditions, secondary oxidation conditions, and a process flow diagram which are hereinafter disclosed in the discussion of each of these facets of the present invention.

The present invention is concerned with the removal of sulfide from an aqueous stream to produce useable sulfur. The sulfide-containing streams will comprise from about 0.1 wt. % sulfide to about 7.0 wt. % sulfide and preferably from about 2.0 wt. % sulfide to about 6.0 wt. % sulfide of the total aqueous stream. The aqueous stream may possess sulfide that is ammonical or is capable of releasing hydrogen sulfide. Solutions of alkali metal sulfides may be treated with ammonium salts to release ammonia and hydrogen sulfide upon treatment with steam, e.g. a solution of NaSH may have $NH_4HCO_3$ added to yield the desired vapor phase composition.

The preferred catalyst will comprise a metal phthalocyanine compound. Particularly preferred metal phthalocyanine compounds include cobalt and vanadium phthalocyanine. Other metallic phthalocyanine compounds would include iron, nickel, copper, molybdenum, maganese, tungsten and the like or mixtures of these. Moreover, any suitable derivative of the metal phthalocyanine catalyst may be employed including the sulfonated derivatives and the carboxylated derivatives such as cobalt phthalocyanie monosulfonate, vandium phthalocyanine disulfonate or cobalt phthalocyanine tetrasulfonate. In an embodiment of this invention it is found that the metallic phthalocyanine catalyst is dispersed on a solid support in the second reaction zone, however, the catalyst may be either dispersed on a solid support or dissolved in the reaction media in the first oxidation zone. Examples of suitable carrier materials would include charcoals, such as wood charcoal, bone charcoal, etc. which charcoals may or may not be activated prior to use, refractory inorganic oxides such as alumina, silica, zirconia, boxite, γ-alumina, etc., activated carbons such as those commercially available under the well known tradenames of Norit, Nuchr and Darco and other similar carbon materials familiar to one skilled in the art. In addition, other natural and synthetic highly porous inorganic carrier materials such as various forms of clay, kieselguhr, etc. may also be desired. However, the preferred carrier materials of the present invention will comprise charcoal and γ-alumina. The process of the present invention contemplates a metal phthalocyanine compound in both the first and the second oxidation stages. It is within the scope of this invention that said metal phthalocyanine compounds may be identical to one another or different from one another. For example, the catalyst in the first and the second oxidation zones may comprise cobalt phthalocyanine disulfonate or the catalyst in the first reaction zone may comprise vanadium phthalocyanine monosulfonate and in the second oxidation zone the catalyst may comprise cobalt phthalocyanine disulfonate. Further, it is contemplated that the catalyst in the first oxidation zone may be either supported or dissolved in the reaction media. In order to avoid process malfunctions and oxidation upsets it is contemplated within the scope of this invention that the metal phthalocyanine catalyst dispersed on the solid support in the second oxidation zone is covered with an aqueous phase. The aqueous phase will comprise a concentrated thiosulfite-containing compound such as ammonium thiosulfate. It is contemplated within the scope of this invention that the ammonium thiosulfate will be present in the liquid phase on the catalyst bed when the sulfide-containing stream comprises ammonia, hydrogen sulfide and water in the vapor phase. Additional details as to the alternative carrier materials, methods of preparation and preferred amounts of the catalytic components are given in the teachings of U.S. Pat. No. 3,108,081 for various phthalocyanine catalysts. The compositions of metal phthalocyanine catalysts are not to be construed as critical to the above set forth invention and the parameters of the amount of metal phthalocyanine catalysts are one which are known to one skilled in the art.

The oxygen-containing gases utilized in the first and the second oxidation zone of the above set forth invention will comprise any gaseous stream which contains oxygen such as oxygen, air, oxygen-nitrogen mixtures, oxygen-argon mixtures, oxygen-nitrogen-argon mixtures, or any combination thereof. The necessary amount of oxygen-containing gases in either the first or the second oxidation zones will be determined by a stoichiometric balance of the overall process and should be known to one skilled in the art. It is to be understood that the sulfide-containing solutions, oxidizing catalysts and oxygen-containing gases are only representative of the class of compounds which may be employed and that the present invention is not necessarily limited thereto.

As hereinbefore set forth the sulfide solution is contacted with an oxygen-containing gas in the presence of a catalyst comprising a metal phthalocyanine compound in a first oxidation zone at polysulfide-formation conditions to produce sulfur and a polysulfide effluent. The polysulfide-formation conditions include a temperature of from about 0° to about 200°C. and a pressure of from about 1 atmosphere to about 100 atmospheres. It should be noted that the sulfur produced in the first oxidation zone may be either removed from the flow process at the first oxidation zone or may be carried through the process flow as an entrained compound within the polysulfide effluent. It is also contemplated that the sulfide-containing stream may be treated initially in the first decomposition zone to produce a vaporous stream for treatment in the second oxidation zone. For example, a stream containing from about 0.01 wt. % to about 2.00 wt. % sulfide is decomposed to produce a vaporous effluent comprising ammonia, hydrogen sulfide and water with a reduced dissolved solids content for oxidation in the second oxidation zone to produce the desired sulfur. In the pure essence of this invention it is contemplated that the first decomposition zone be maintained at decomposition conditions which include a temperature of about 115° to about 125°C. and a pressure of about 10 psig. to about 20 psig. to produce a vaporous phase and the second oxidation zone be maintained at oxidation conditions which include a temperature of from about 115° to about 125°C. and a pressure of from about 10 psig. to about 20 psig. to produce the resultant sulfur. The consequence of conducting the process under lower temperatures and pressures than previously known in the art is that the system of decomposition and subsequent oxidation is performed in a vaporous phase, whereas in the prior art the oxidation and subsequent decomposition were performed in a liquid phase. The catalyst bed comprising a metal phthalocyanine compound is wetted with the thiosulfate-containing compound formed in the second oxidation zone and is maintained in a liquid form by running at predetermined low temperatures and pressures at which conditions both liquid and vapor coexist. The use of the vapor phase with the thiosulfate-containing compound wetting the catalyst bed allows an equilibrium to occur which increases the selectivity of oxidation, therefore creating a greater amount of sulfur and a minimization of thiosulfate-containing compounds produced in the subsequent oxidation zone. In a preferred embodiment of the present invention, steam is separated in the subsequent oxidation zone and recycled to the decomposition zone to effect the decomposition of the polysulfide compound to produce the vapor phase charge to the subsequent oxidation zone.

The invention will be further described with reference to the attached drawing which is a schematic outline of the process under discussion. The attached drawing is merely intended as a general representation of the preferred flow scheme with no intent to give details about vessels, heaters, condensers, compressors, valves, process control equipment, etc. except where a knowledge of these devices is essential to the understanding of the present invention or would not be self evident to one skilled in the art of sulfide-stream treating art.

Referring now to the drawing, an aqueous ammonical sulfide-containing stream is charged through line 1 to the first oxidation zone 3. An oxygen-containing gas, preferably an oxygen-enriched air, is charged to the first oxidation zone 3 through line 2. The first oxidation zone 3 is maintained with a metal phthalocyanine catalyst for the purpose of aiding oxidation. The oxidation of the sulfide-containing stream results in the production of sulfur and a polysulfide effluent. The sulfur may be removed from the first oxidation zone 3 through line 5. The polysulfide effluent formed in the first oxidation zone 3 is withdrawn from oxidation zone 3 through line 6. The excess air, inert gases, or oxygen are vented from the polysulfide stream from line 6 through line 7. The polysulfide effluent from line 6 is charged to the first decomposition zone 8 at a temperature of from about 115° to about 125°C. and a pressure of about 10 psig. to about 20 psig. to produce a vaporous phase effluent containing water, hydrogen sulfide and ammonia and a liquid phase comprising water, ammonia and elemental sulfur. The decomposition is performed within the first decomposition zone 8 by means of the passage of steam to the first decomposition zone 8 through line 15, said steam being generated either independently and charged to reaction zone 8 through line 16 by means of line 15 or in a closed loop recycle from the second oxidation zone by means of line 15. The liquid effluent comprising water, ammonia and elemental sulfur is withdrawn from decomposition zone 8 by means of line 17. The liquid effluent stream is separated to yield spent water, sulfur and ammonia. The water may be utilized in the production of steam for decomposition zone 8 and the sulfur may augment that recovered at line 14. The vaporous effluent from the first decomposition zone is withdrawn from zone 8 through line 9 and charged to a second oxidation zone 10. Oxygen or an oxygen-containing gas is charged to the second oxidation zone through line 12. The second oxidation zone is charged with a metal phthalocyanine catalyst dispersed on a solid support 11. The second oxidation zone is maintained at a temperature of from about 115° to about 125°C. and a pressure of from about 10 psig. to about 20 psig. to produce steam, sulfur and a thiosulfate compound. The process of this invention contemplates a contact of the metal phthalocyanine catalyst with a liquid phase comprising a thiosulfate-containing compound which is in equilibrium at a temperature and pressure that favors the coexistence of both liquid and vapor state. The excess thiosulfate-containing compound is withdrawn from second oxidation zone 10 through line 13 and disposed of as known to one skilled in the art or may be recycled to maintain a thoroughly wetted support bed. Sulfur produced, which is the essence of this invention, is recovered through line 14 and properly disposed of or sold as a valuable chemical to the chemical industry. The steam prepared in the second oxidation zone 10 is withdrawn from said zone 10 through line 15 and charged to the first decomposition zone 8, or may be processed for ammonia removal by methods known to the art to reduce its ammonia content.

The following examples are given to illustrate the further novelty, mode of operation and utility of the present invention. It is not intended to limit unduly the present invention to the flow scheme, process conditions and types of catalysts employed therein, since these are intended to be illustrative rather than restrictive.

EXAMPLE I

In this example an aqueous stream containing ammonium sulfide was reacted with air in the presence of a cobalt phthalocyanine catalyst supported on charcoal. The resultant liquid product was separated from excess air and charged to a decomposition zone. The composition of the product charged to the second oxidation zone is set forth in Table I below

TABLE I

| Sulfur Compound | Quantitative Presence[1] | |
|---|---|---|
| | A | B |
| Ammonium Sulfide | 20.0 | 18.0 |
| Ammonium Polysulfide | 67.4 | 56.8 |
| Ammonium Thiosulfate | 5.5 | 4.8 |
| Ammonium Sulfate | 0.0 | 0.5 |

[1]Grams per period of operation

The second oxidation zone was maintained at a temperature of 128° to 130°C. and a pressure of 37 psig. as afforded by the presence of steam. The second oxidation zone was subjected to a charge of air 1.60 times the stoichiometric necessity for the oxidation of the polysulfide and equipped with a catalyst comprising cobalt phthalocyanine dispersed on a charcoal support. The secondary oxidation reactor bottoms stream was recovered and analyzed, said analysis being set forth in Table II below:

TABLE II

| Sulfur Compound | Quantitative Presence[1] |
|---|---|
| Ammonium Sulfide | 2.4 |
| Ammonium Polysulfide | 5.6 |
| Ammonium Thiosulfate | 10.1 |
| Ammonium Sulfate | 5.7 |
| Elemental Sulfur | 69.2 |

[1]Grams yield per period of operation

The charge to the secondary oxidation zone was maintained at a liquid hourly space velocity of 1.0. The polysulfide was continuously charged to the second oxidation zone in a composition as set forth in Table I line B and the secondary oxidation reactor bottoms stream was again analyzed, said analysis set forth in Table III.

TABLE III

| Sulfur Compound | Quantitative Presence[1] |
|---|---|
| Ammonium Sulfide | 1.6 |
| Ammonium Polysulfide | 4.5 |
| Ammonium Thiosulfate | 15.8 |
| Ammonium Sulfate | 3.3 |
| Elemental Sulfur | 54.6 |

[1]Grams yield per period of operation

It should be noted that the values in Tables II and III were obtained in a system which was maintained totally in the liquid phase and that the temperature and pressure of the secondary oxidation zone were outside the scope of this invention.

EXAMPLE II

In this example the physical conditions of pressure and temperature were changed to a temperature of 120°C. and a pressure of 14 psig., otherwise, the experiment of Example I was repeated with insignificant variance. The change in temperature and pressure conditions changed the phase in the secondary oxidation zone from liquid to vapor, therefore the catalyst dispersed on a charcoal support was initially wetted with excess ammonium thiosulfate. The secondary oxidation reactor bottoms stream was recovered and analyzed, said analysis being set forth in Table IV below.

TABLE IV

| Sulfur Compound | Quantitative Presence[1] |
|---|---|
| Ammonium Sulfide | >0.01 |
| Ammonium Polysulfide | >0.01 |
| Ammonium Thiosulfate | 8.0 |
| Ammonium Sulfate | 0.2 |
| Elemental Sulfur | 96.5 |

[1]Grams yield per period of operation

A comparison of the results shown in Table IV with those of Tables II and III demonstrate the unexpected results of the present invention. The utilization of the low pressure and low temperatures lowered the quantitative presence of ammonium sulfide in the oxidation bottoms from 2.4 and 1.6 of Tables II and III respectively to less than 0.01 of Table IV, ammonium polysulfide from 5.6 and 4.5 of Tables II and III respectively to less than 0.01 of Table IV, ammonium thiosulfate from 10.1 and 15.8 of Tables II and III respectively to 8.0 of Table IV, ammonium sulfate from 5.7 and 3.3 of Tables II and III respectively to 0.2 of Table IV. The process of the present invention also increased the quantitative presence of the desired elemental sulfur from 69.2 and 54.6 of Tables II and III respectively to 96.5 of Table IV. The vapor phase effectuation of the decomposition and secondary oxidation zone clearly produced an unexpected result in the quantitative presence of the final sulfur compounds. The desirability of the elemental sulfur and the undesirability of the other remaining sulfur compounds, especially ammonium sulfate, is well-known in the art of sulfide removal processes.

EXAMPLE III

In this example the process of Example II was maintained at a pressure of 14 psig., a temperature of 119°C., and a liquid hourly space velocity of 1.0 in the decomposition and secondary oxidation zone. The composition of the charge to the decomposition zone was in accordance with Table V below.

TABLE V

| Sulfur Compound | Quantitative Presence[1] |
|---|---|
| Ammonium Sulfide | 43 |
| Ammonium Polysulfide | 139 |
| Ammonium Thiosulfate | 12 |
| Ammonium Sulfate | — |
| Total Sulfur | 194 |

[1]Grams per period of operation

The product of the secondary oxidation zone was recovered in the reactor bottoms stream and analyzed, said analysis being set forth in Table VI below

TABLE VI

| Sulfur Compound | Quantitative Presence[1] |
| --- | --- |
| Ammonium Sulfide | 0.7 |
| Ammonium Polysulfide | 2.0 |
| Ammonium Thiosulfate | 6.8 |
| Ammonium Sulfate | — |
| Elemental Sulfur | 165.0 |
| Total Sulfur | 201. |

[1]Total grams yield per period of operation

The quantitative presence is measured in relative units, therefore, it can clearly be seen that the 165.0 is relatively unexpected in comparison with the other sulfur end products. The ammonium thiosulfate is utilized to maintain a wet phase on the surface of the support bed in the secondary oxidation zone, therefore, a relatively very small percentage of the initial product will remain unconverted to a desirable product. The end product analysis also produced a quantity of steam 75 wt. % of the water was recovered as vapor; however, as set forth in a preferred embodiment of the present invention, the steam was separated from the sulfur-containing reactor bottoms and charged for reutilization in the decomposition zone. The amount of bottoms water is controlled by the temperature-pressure relationship.

EXAMPLE IV

In this example the process of Example III is maintained, however, oxygen is utilized in substitution for air and a vanadium phthalocyanine dispersed on a γ-alumina support catalyst is substituted for the cobalt phthalocyanine dispersed on the charcoal support catalyst. The subsequent analysis of the reactor bottoms stream is found to also contain the unexpected results similar to those set forth in Table VI of Example III.

I claim as my invention:

1. In a process for the preparation of sulfur by contacting an aqueous ammonium sulfide solution with an oxygen-containing gas in the presence of a metal phthalocyanine catalyst at polysulfide-forming conditions to produce sulfur and a polysulfide effluent, the improvement which comprises the steps of
   a. decomposing at least a portion of said polysulfide effluent with steam at a temperature of from about 115° to about 125°C. and a pressure of about 10 psig. to about 20 psig. to produce a vaporous effluent comprising water, hydrogen sulfide and ammonia;
   b. contacting at least a portion of said vaporous effluent with an oxygen-containing gas in the presence of a metal phthalocyanine catalyst dispersed on a solid support, said metal phthalocyanine catalyst being in contact with a liquid phase comprising a thiosulfate-containing compound, at a temperature of from about 115° to about 125°C. and a pressure of from about 10 psig. to about 20 psig. to produce steam, sulfur and a thiosulfate compound; and
   c. recovering the resultant sulfur.

2. The process of claim 1 further characterized in that the polysulfide-formation conditions include a temperature of from about 0° to about 200°C. and a pressure of from about 1 atmosphere to about 100 atmospheres.

3. The improvement of claim 1 further characterized in that said thiosulfate-containing compound is an ammonical thiosulfate compound.

4. The improvement of claim 3 further characterized in that the thiosulfate-containing compound is ammonium thiosulfate.

5. The improvement of claim 1 further characterized in that the steam of step (b) is recycled to step (a).

6. The process of claim 1 further characterized in that elemental sulfur is recovered by filtering said polysulfide effluent.

7. The process of claim 1 further characterized in that the metal phthalocyanine catalyst comprises cobalt phthalocyanine.

8. The process of claim 1 further characterized in that the metal phthalocyanine catalyst comprises vanadium phthalocyanine.

9. The improvement of claim 1 further characterized in that the solid support comprises charcoal.

10. The improvement of claim 1 further characterized in that the solid support comprises γ-alumina.

11. The process of claim 1 further characterized in that the oxygen-containing gas is air.

12. The process of claim 1 further characterized in that the oxygen-containing gas is oxygen.

* * * * *